UNITED STATES PATENT OFFICE.

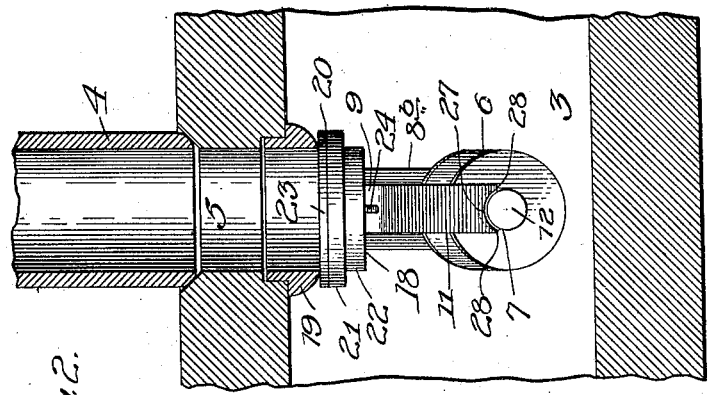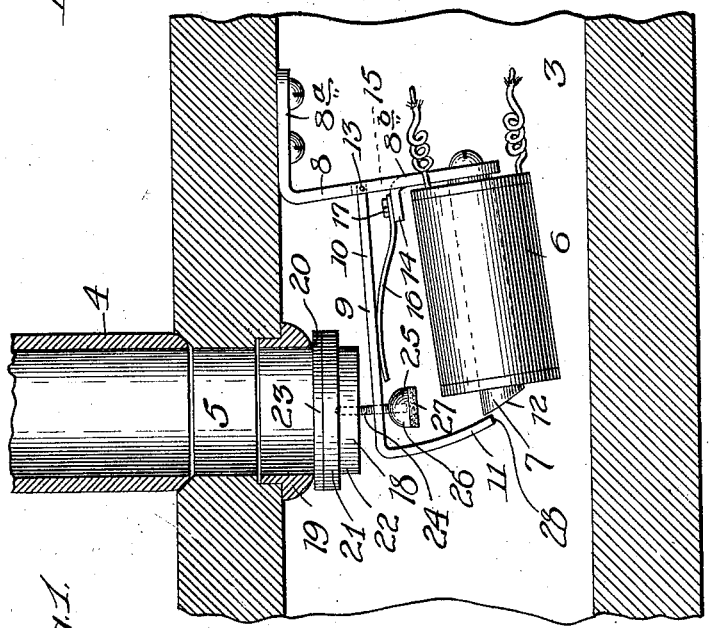

LOUIS J. WICK, OF HIGHLAND, ILLINOIS.

VALVE ACTION FOR ORGANS.

1,403,930.

Specification of Letters Patent.   Patented Jan. 17, 1922.

Application filed November 28, 1919.  Serial No. 341,113.

*To all whom it may concern:*

Be it known that I, LOUIS J. WICK, a citizen of the United States, residing at Highland, in the county of Madison and State of Illinois, have invented a new and useful Improvement in Valve Actions for Organs, of which the following is a specification.

My invention relates, more particularly, to valve-actions for controlling the inlet of the air under pressure to the pipes of organs.

Generally stated, my object is to provide an electrically-operated valve mechanism of a novel, simple, rigid, economical and positively-operating construction which will operate to open and close the valve quickly and effect positive seating of the valve; and to provide for the ready mounting of the mechanism in place for use.

Referring to the accompanying drawing—

Figure 1 is a sectional view taken through a wind-passage of an organ with an organ-pipe communicating therewith and valve mechanism, shown in elevation, controlling the passage of the wind-pressure into the pipe, the structure shown embodying my invention; and Figure 2, a view like Fig. 1 viewing the structure from the left-hand side of Fig. 1.

In the arrangement shown a passage for wind-pressure is represented at 3, this passage in practice being in communication with a supply (not shown) of air under pressure, and connected with an organ-pipe represented at 4 through an opening 5 in the passage 3 and supplied with air under pressure for operating it, from the passage 3, the flow of air to the pipe being controlled by electrically-operated valve mechanism located in the air-passage 3 and constructed in accordance with my invention, and of which the following is a description; 6 is an electro-magnet, the core of which is represented at 7, this magnet being supported at one end, as at one end of its core 7, on a bracket 8 of angle-shape as shown and rigidly secured at one of its legs 8ª to the underside of the top wall of the passage 3, as shown. Co-operating with the core 7 is an armature 9 preferably formed of the straight bar-portion 10 and the laterally extending depending arm 11, preferably curved as represented. The armature is pivotally supported at its opposite end on the leg 8ᵇ of the bracket at the point indicated at 13, the curved portion 11 of the armature and also the outer face 12 of the core being preferably concentric with the pivot 13. The pivoted connection 13 referred to is preferably provided by forming from the metal of the leg 8ᵇ of the bracket 8, a tongue 14 which is bent to the position shown in Fig. 1 and forms an opening 15 in the bracket into which the armature 10 extends, a pin forming the pivot 13 extending through the bracket and armature as shown. A leaf-spring 16 secured at one end to the tongue 14, as indicated at 17, and bearing against the underside of the armature 9 operates to yieldingly hold the armature in raised position, and the valve hereinafter referred to in position to prevent the passage of air into the pipe 4. The valve referred to and represented at 18 co-operates with a seat 19 secured in the lower end of the opening 5, this seat being preferably formed to provide an annular seating surface 20, at its lower extremity, of the minimum area, as shown. The valve which is carried by the armature 9 is adapted to fit flatwise against the seating surface 20 and in such position closes the pipe 4 to the interior of the passage 3, this valve by preference being of composite construction formed of a disk 21 of sole leather, a disk 22 of soft felt and a leather disk 23, these disks being secured together in any suitable way. The valve 18 preferably thus formed is supported on the armature by means of a threaded rod 24 extending through, and fastened in, the armature-bar 10, the valve 18 being screwed upon the upper end of the rod 24 and thus adjustable up and down thereon, and the lower end of this rod having screwed thereon to be adjustable on this rod, a bumper 25 preferably formed of a leather nut 26 with a facing 27 of soft felt, this bumper extending into such a position that it will strike the electro-magnet 6 in the downward movement of the armature and form a stop for limiting the downward movement of the latter.

The parts of the mechanism are preferably adjusted to cause them to assume the relative positions shown in the drawing, in which position the lower end of the armature 9, which is recessed at its lower surface to describe an arc concentric with the core 12 as represented at 27, is located close to the outer face 12 of the core, as shown, the side portions 28 of the armature extending below the extreme upper surface of the core.

In the use of the mechanism energization of the electromagnet 6 draws the portion 11 of the armature across the face 12 of the core, thereby swinging the armature downwardly on its pivot 13 and pulling the valve 18 away from the seat 20, thus opening the interior of the reed 4 to the air-passage 3 from which air for sounding the reed passes into the latter. When the current through the magnet 6 is interrupted the magnet becoming de-energized, the spring 16 forces the armature 9 and the valve 18 upwardly, the latter seating against the seat 20 and closing communication between the reed 4 and air-passage 3.

The electro-magnet 6 exerts its greatest power when the armature is in the position shown in the drawings; viz., just at the point of traversing the field of the core, and the valve is seated against the seat 20, this arrangement being highly advantageous in a structure of this general character as the valve exerts its maximum resistance to movement away from its seat, in its initial movement, at which time the electromagnet is exerting its maximum force. Proper adjustment of the armature relative to the core to produce this result may be accomplished in the structure shown by screwing the valve 18 up or down on the rod 24. The adjustment of the bumper 25 on the rod 24 affords a means for regulating the stroke of the armature to prevent the latter from striking against the heads of the electromagnet, the bumper as constructed operating noiselessly.

It will be noted that the armature and valve have a comparatively short distance to travel and that the pull of the magnet is positive and instantaneous the moment current is applied. The return stroke of the valve is also instantaneous because the moment the circuit through the magnet 6 is broken, the spring 16 together with the action of the air rushing through the opening 5, quickly forces the valve to closed condition.

The special form of seat provided is of advantage in that it serves to reduce to a very material extent the pressure required to open the valve, by reason of the exposure to the air-pressure in the passage 3 of that part of the upper surface of the valve which extends beyond the seat-surface, or edge, 20, it being noted that the only pressure required to be overcome in the opening of the valve is that which is exerted against the bottom surface of the valve over an area equal to the area of the space bounded by the seat 20.

By preference, the moving parts carrying the valve are of metal, which eliminates trouble common to ordinary forms of organ valve mechanisms due to atmospheric and thermal conditions.

While I have illustrated and described a particular construction embodying my invention, I do not wish to be understood as limiting it thereto as the same may be variously modified and altered without departing from the spirit of my invention.

What I claim as new and desire to secure by Letters Patent is:

1. The combination with an air passage having an outlet, of valve mechanism for controlling the passage of air through said outlet comprising a valve closing said outlet in its movement in the direction of flow of air through said outlet, an electro-magnet, a spring and a pivotally supported armature directly engaging said spring and cooperating with said electro-magnet and operating when said electro-magnet is energized to open said valve against the resistance of said spring.

2. The combination with an air passage containing an outlet, of valve mechanism for controlling the passage of air through said outlet comprising a valve, a supporting member in the form of a bracket supported adjacent said valve, an electro-magnet carried by a leg of said bracket, an armature pivotally supported on said leg and cooperating with said electro-magnet and operating when said electro-magnet is energized to open said valve, and spring means carried by said leg and engaging said armature.

3. The combination with an air passage containing an outlet, of valve mechanism for controlling the passage of air through said outlet comprising a valve, a supporting member in the form of a bracket supported adjacent said valve, an electro-magnet carried by said supporting member, an armature pivotally supported on said supporting member and cooperating with said electro-magnet and operating when said electro-magnet is energized to open said valve, said bracket having an ear thereon, and a spring connected with said ear and operatively engaging said armature.

4. The combination with an air passage containing an outlet, of valve mechanism for controlling the passage of air through said outlet comprising a valve, a supporting member in the form of an angle bracket secured at one leg to a wall of said passage, an electro-magnet carried by the other leg of said bracket, the outer extremity of the core of said magnet being of curved shape in cross-section, and the leg of said bracket to which the electro-magnet is secured being provided with an ear formed from the metal of said leg and affording an opening in the latter, an armature extending at one end into said opening, means pivotally connecting said armature iwth said bracket, said armature having a portion presenting a curved face at which said armature moves across the curved end surface of said core, said armature operating said valve, and a spring connected with said ear and bearing against said armature.

5. The combination with an air passage having an outlet, of valve mechanism for controlling the passage of air through said outlet comprising a valve closing said outlet in its movement in the direction of flow of air through said outlet, an electro-magnet, an armature pivotally supported at one end and extending at its opposite end adjacent the core of said electro-magnet, and a spring engaging said armature between the ends of the latter, said armature operating, when said electromagnet is energized, to open said valve against the resistance of said spring.

6. The combination with an air passage having an outlet, a valve mechanism for controlling the passage of air through said outlet comprising a valve closing said outlet in its movement in an upward direction and in the direction of flow of air through said outlet, an electro-magnet, a spring, and a pivotally supported armature engaging said spring and cooperating with said electro-magnet and operating when said electro-magnet is energized to open said valve against the resistance of said spring.

LOUIS J. WICK.